(12) United States Patent
Braghiroli

(10) Patent No.: US 7,738,120 B2
(45) Date of Patent: Jun. 15, 2010

(54) METHOD AND APPARATUS FOR DETERMINING GEOMETRICAL DIMENSIONS OF A VEHICLE WHEEL

(75) Inventor: Francesco Braghiroli, Reggio Emilia (IT)

(73) Assignee: Snap-On Equipment SRL a Unico Socio, Correggio (Re) (IT)

( * ) Notice: Subject to any disclaimer, the term of this patent is extended or adjusted under 35 U.S.C. 154(b) by 0 days.

(21) Appl. No.: 12/182,414

(22) Filed: Jul. 30, 2008

(65) Prior Publication Data

US 2009/0033949 A1 Feb. 5, 2009

(30) Foreign Application Priority Data

Jul. 30, 2007 (EP) .................................. 07014949

(51) Int. Cl.
*G01B 11/02* (2006.01)
*G01B 11/24* (2006.01)
(52) U.S. Cl. ...................................... 356/635; 356/614
(58) Field of Classification Search ... 356/237.1–237.5, 356/625–640
See application file for complete search history.

(56) References Cited

U.S. PATENT DOCUMENTS

| 5,054,918 | A |   | 10/1991 | Downing et al. |
| 5,268,731 | A | * | 12/1993 | Fuchiwaki et al. ..... 356/139.09 |
| 2004/0165180 | A1 |   | 8/2004 | Voeller et al. |
| 2008/0218742 | A1 | * | 9/2008 | Sakoda et al. ................. 356/73 |
| 2009/0040533 | A1 | * | 2/2009 | Takahashi et al. ........... 356/612 |

FOREIGN PATENT DOCUMENTS

EP 1 515 129 B1 3/2005
EP 1 584 495 B1 10/2005

* cited by examiner

*Primary Examiner*—Michael P Stafira
(74) *Attorney, Agent, or Firm*—McDermott Will & Emery LLP

(57) ABSTRACT

A method and an apparatus of determining geometrical dimensions of a motor vehicle wheel (rim/tyre assembly) 1 by contact-less sensing, wherein the wheel is fixed on wheel receiving means 8 of a tyre changer, that at least one planar light beam 3 is emitted on to the wheel or at least a part of the wheel, wherein the light beam reflected at the impingement area is detected, and wherein the directions of the emitted and reflected light beams are evaluated for determining the shape and/or position of the respective impingement area 4 on the wheel 1.

32 Claims, 5 Drawing Sheets

Tire Numbering Systems

METHOD AND APPARATUS FOR DETERMINING GEOMETRICAL DIMENSIONS OF A VEHICLE WHEEL

TECHNICAL FIELD

The invention concerns a method of and apparatus for determining geometrical dimensions of a vehicle wheel.

BACKGROUND

U.S. Pat. No. 5,054,918 discloses a structured light scanning system that determines structural features of a vehicle wheel by analysing the reflected light from a stripe where a planar light beam impinges the body of the vehicle wheel.

US 2004/0165180 A1 discloses a method and an apparatus for determining the geometrical dimensions of a vehicle wheel or of parts thereof wherein an image is acquired by a camera system to facilitate vehicle wheel service procedures. The vehicle wheel may be fixed to a wheel balancer or a tyre changer.

The problem of the present invention is to provide a method and an apparatus of the kind set forth in the opening part of this specification, in which the geometrical dimensions of a vehicle wheel at least one part of a vehicle wheel are reliably determined.

SUMMARY

That problem is solved by the features of claims 1 and 16. The dependent claims recite advantageous developments of the invention.

The invention provides that the wheel (rim/tyre assembly) contour, especially the rim contour is sensed in an optical manner. A preferred optical detector system is based on a digital camera, whose sensor signals are evaluated on the principle of triangulation. The sensor signals of the detector are converted into electrical digital signals. A suitable transducer device is preferably integrated into the detector. Preferably scanning is effected at two sides of the vehicle wheel (rim/tyre assembly) or of the rim well-base bed. Further scanning can be effected on the periphery (tire tread) of the vehicle wheel. Additionally, the rim contour can be determined at least in the regions in which the fitting or removal tool is moved during the fitting or removal operation. In known fashion, particularly in the tyre removal operation, it is possible to use two removal tools which engage the two bead regions of the vehicle tyre. The movement of the respective fitting or removal tool is guided in dependence on the sensing signals in such a way that no contact with the surface in the rim bed and at the rim beads occurs. The respective fitting or removal tool is therefore always guided at a given safety spacing from the rim surface.

For contact-less sensing, the respective sensing device can be a sheet of light imaging system based on the principle of optical laser triangulation, also designated hereafter as triangulation method. The optical sensing device can have a light source that emits a light beam in a planar light beam shaped in a sheet of light or a planar light beam onto the wheel surface or the rim surface in one or more given directions and intersects the rim surface in a plurality of impingement points along a stripe-shaped impingement area. At each of the impingement points, the light beam is scattered in a plurality of light rays that are reflected. At least a plurality of these reflected light rays will be then concentrated or focused by a lens system or input pupil stripe-shaped projected image area on a two-dimensional photosensitive sensor surface. The spacings and thus positions of the individual impingement points sensed at the wheel or the rim can then be determined by the triangulation method in dependence on the directions of the emitted and reflected light beams, particularly on the sensor signals.

One or more sensing device or devices can be arrange on a wheel balancer or a tyrechanger.

BRIEF DESCRIPTION OF THE DRAWINGS

The invention will be described in greater detail hereinafter by means of an embodiment by way of example with reference to the Figures in which.

DETAILED DESCRIPTION

Figure 1:
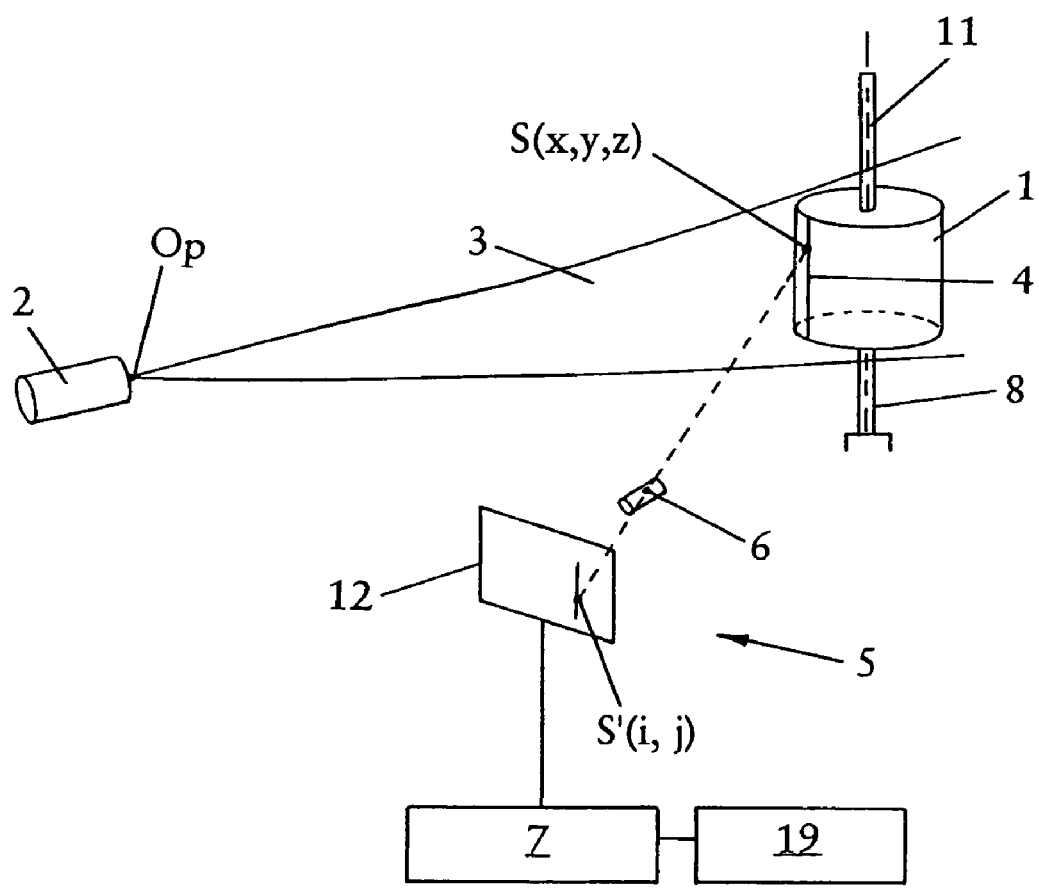
FIG. 1 shows schematically an embodiment of a sensing device including a light source and a detector.

The illustrated embodiments include a wheel receiving means 8 to which a vehicle wheel (rim/tyre arrangement) 1 can be fixed. The wheel receiving means can have as illustrated a receiving bar, a wheel plate on which the rim is placed, or clamping arms on which the rim is supported, or another support arrangement.

Contact-less and in particular optical sensing with one or more sensing devices is effected essentially for sensing the rim contours and or structural features of the vehicle wheel 1. Additionally, it is possible to sense geometrical dimensions of the wheel 1 and of wheel parts.

The principle of such contact-less sensing device (FIG. 1) of the invention rests on a triangulation method such as described hereafter combined with a light source 2 which generates a planar light beam and with a detector 5 producing electrical, especially digital signals which are proportional of a projected image of a stripe-shaped impingement area 5 on a wheel surface. The sensing device has the light source 2, e.g. a laser source, comprising a pattern generator, e.g. an optical line generator made with a cylindrical lens, which emits a planar light beam 3 shaped in a sheet of light by the pattern generator onto the surface of the vehicle wheel 1 in one or more given directions. The planar light beam 3 intersects the wheel surface in a plurality of impingement points which forms the stripe-shaped impingement area 4 on the wheel surface. The impingement points belong to both the impinged wheel surface and the sheet of the planar light 3. At each of these impingement points, the light beam is scattered in a plurality of light rays and form a reflected beam. The reflected light beam will be then detected by a photosensitive detector 5 which has an image sensor surface 12 that may be either a CCD device or preferably a CMOS device. The image sensor surface 12 provides a two-dimensional light or photosensitive surface. Before being detected, the reflected light beam is concentrated to a point or focused by a input pupil 6 which is a focusing lens system that may be associated with an optical band-pass filter, and projected on to the focal plane of the input pupil 6 on to the photosensitive image sensor surface 12 where a stripe-shaped projected image area is produced. In order to improve measurement accuracy, each projected point of the strip-shaped projected image area has a position determined preferably with a sub-pixel resolution rather than the physical pixel one. That sub-pixel peak determination can be achieved by several well-known detection techniques, such as the Gaussian approximation, centroid or centre of mass algorithms, or parabolic estimator. Relationship between the position in a three dimensional coordinate system of an impingement point, expressed in unit of length of the système international (SI) base unit, and the position in a two dimensional coordinate system of the corresponding projected point, expressed preferably in sub-pixel, is defined by calibration using a reverse transformation. Calibration can be carried out either by using the so-called model-based calibration based on the geometric camera model approach or by using the direct or black-box calibration based on a polynomial interpolation such as the cubic spline interpolation.

The spacings and thus positions of the individual impingement points sensed at the wheel (rim/tyre assembly) or the rim can then be determined in dependence on the directions of the emitted and reflected light beams. It should be noted that the geometric optical setup of the optical sensing device can be designed in a way that the Scheimpflug principle is respected in order to avoid excessive defocusing at different distances, and that the background subtraction can be implemented in order to reduce the system sensitivity to ambient light. Moreover, both the light power and the exposure time of the photosensitive detector 5 can be controlled by the system in order to achieve accurate measurements in all the environmental conditions, such as sunlight, artificial light, shiny chromed surfaces, black dusty surfaces.

A point 5 belonging to the stripe-shaped impingement area 4 on the wheel surface and to the planar light beam 3 has the three-dimensional coordinates (x,y,z). Point S and the other points of the impingement area 4 are projected onto the image sensor surface 12 at a point s' with two-dimensional coordinates (i,j).

An output pupil $0p$ of the light source 2, a wheel axis 11 and the imaged sensor surface 12 are located in given positions provided by the measuring equipment. Thus, for each points of the stripe-shaped impingement area 4 on the wheel surface and for each point s' of the stripe shaped projected image on the image sensor surface 12 a single point triangulation can be performed by an electronical evaluation arrangement (computer) 7 which is connected to the detector 5. The several point locations of the stripe-shaped projected image area on the image sensor surface 12 are determined by the above described sub-pixel search technique. The distance of each point of the impingement area 4 from the output pupil $0p$ and therefore from a thereto related reference position can be determined in three-dimensional coordinates (x, y, z).

The image sensor surface 12, especially the CMOS device generates image signals which are proportional to the location of each point of the stripe-shaped projected image area on the image sensor surface 12. The image signals are transformed into digital signals within the detector 5 which can be designed as a digital camera. The evaluation arrangement 7 is connected to the detector 5 and performs the above explained triangulation method. The described measuring system of the embodiment shown in FIG. 1 performs a linear projective transformation from the three-dimensional projective space into the two-dimensional space of the image sensor surface 12 and a reverse transformation into the three-dimensional space by using a triangulation method. The light source 2 and the detector 5 can be placed in a common housing or on a common support with a fixed distance between the light source 2 and the detector 5.

Figure 2:
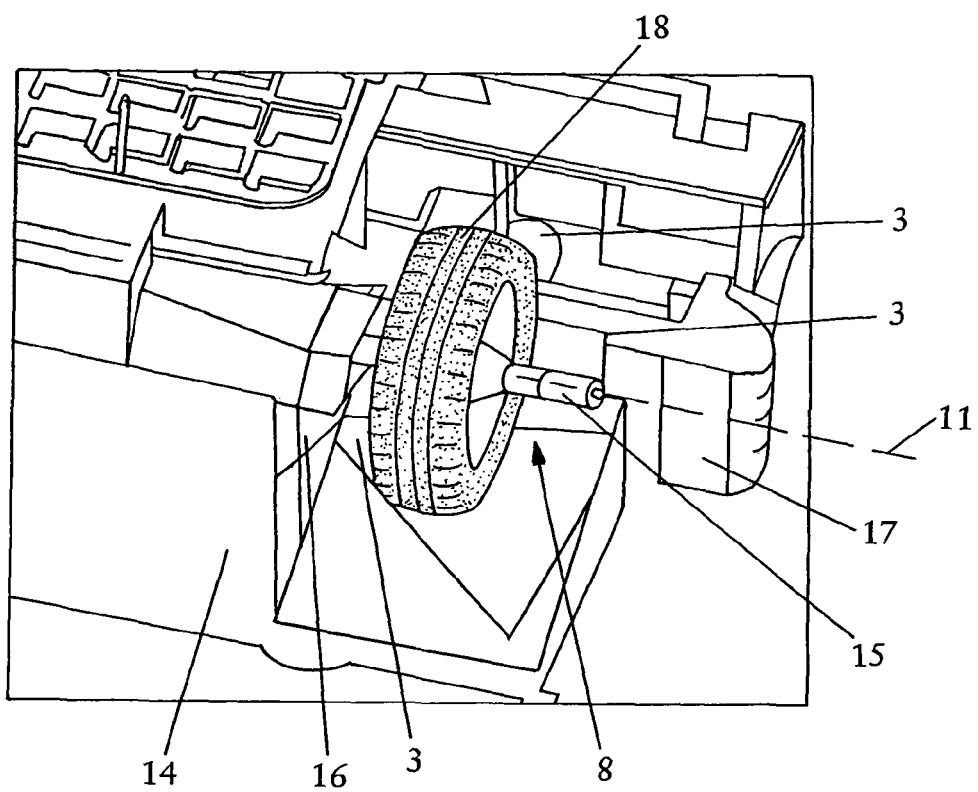
FIG. 2 shows a wheel balancer which is equipped with three embodiments of the sensing device.

FIG. 2 shows a wheel balancer 14 which is equipped with three sensing devices 16, 17, 18. Each sensing device is designed as shown in FIG. 1. The vehicle wheel 1 is fixed in known manner to a measuring shaft 15 which forms the wheel receiving device 8 of the wheel balancer at a fixing location and is mounted rotatably about an axis of rotation which is defined by the measuring shaft and which, in a centred clamping condition, coincides with the wheel axis 11. That ensures a stationary arrangement for the wheel axis 11 on the wheel balancer 14.

The dimensions and positions of constituent parts of the vehicle wheel 1 can be measured with one or more of the sensor devices 16, 17, 18 ascertained with computer aid. All surfaces on the vehicle wheel 1 can be detected by means of three sensor devices which are associated with the inside (left-hand sensor device 16 in the Figure), the outside (right-hand sensor device 17 in the Figure) and the tread surface (upwards sensor device 18 in the Figure) of the vehicle wheel 1.

The respective rotary angle position of the vehicle wheel 1 can be implemented by a rotary angle sensor connected in conventional manner to the measuring shaft 15 of the wheel balancing machine. It supplies rotary angle increments to the evaluation arrangement 7 when the vehicle wheel 1 rotates. That provides positional information with respect to the respective rotary angle positions of the surface location scanned by the respective sensor device on the wheel surface. A tyre inflation valve whose rotary angle position on the vehicle wheel 1 is detected by the sensor device 18 scanning the outside of the vehicle wheel can serve as the rotary angle reference.

The sensor device 16 associated with the inside of the vehicle wheel can be mounted to the machine housing of the wheel balancer 14 preferably below the measuring shaft 15. The sensor device 17 associated with scanning of the tread surface of the vehicle wheel 1 can be disposed in the proximity of a pivot axis of a wheel guard hood which in the measuring run is pivoted over the rotating wheel in known manner. The sensor device 18 associated with the outside of the vehicle wheel 1 can be arranged fixedly or stationary on or connected to the pivotable wheel guard hood.

The planar light beams 3 emitted form the sensor devices 16, 17, 18 are positioned preferably parallel with respect to the measuring shaft 15 which forms the wheel receiving device 8 on the wheel balancer 14.

The inner sensing device 16 can be used to detect:

The inner rim shape to detect the correct weight position on the left side or inside the rim. This detection can be performed by using digital camera for the detector 5 and implementing pattern matching techniques to identify some rim features.

The distance and the diameter of the rim.

The radial and lateral rim out on the left side of the rim.

The number and location of spokes, including unevenly distributed spokes. This detection can be performed by using a digital camera and implementing blob detection techniques.

Bulges and depressions of the tyre sidewall. This detection can be performed by using a digital camera and implementing blob detection and pattern matching techniques to identify specific defects.

The type of the rim to determine the best wheel weight placement mode and/or type of wheel weight to be used. This detection can be performed by using a digital camera and implementing pattern matching techniques.

The presence of wheel weights attached to the rim. This detection can be performed by using a digital camera and implementing pattern matching techniques to identify wheel weights.

Improper bead seating. This detection can be performed by using a digital camera and implementing pattern matching techniques.

Improper wheel centering.

The letters and numbers on the tire sidewall identify tyre properties such as: tyre manufacturer, model name, part number, serial number, type of tyre, type size designation, aspect ratio, DOT code, load index, speed index, etc.

The digital camera can also be used as a standard digital camera to display on the balancer screen the live image of the intern part of the rim. This can help the operator when he has to attach adhesive wheel weights. In this case the light source can be a diffused light.

The outer sensing device can be used to detect:

The outer rim shape to detect the correct weight position. This detection can be performed by using a digital camera and implementing pattern matching techniques to identify specific rim features.

The width of the rim.

The radial and lateral rim out on the right side of the rim.

Bulges and depressions of the tyre sidewall. This detection can be performed by using a digital camera and implementing blob detection and pattern matching techniques to identify specific defects.

The type of the rim to determine the best wheel weight placement mode and/or type of wheel weight to be used.

The presence of wheel weights attached to the rim. This detection can be performed by using a digital camera and implementing pattern matching techniques.

The valve position. This detection can be performed by using a digital camera and implementing pattern matching techniques.

The bead seating. This detection can be performed by using a digital camera and implementing pattern matching techniques.

The letters and numbers on the tire sidewall identify tyre properties such as: tyre manufacturer, model name, part number, serial number, type of tyre, type size designation, aspect ratio, DOT code, load index, speed index, etc.

The rear sensing device can be used to detect:

The tread depth. Colour map and 3D representations give a very comprehensive analysis which possible with the sensor device.

The radial runout of the tire tread.

The tire geometrical conicity.

The tread flatspots. This detection can be performed by using a digital camera and implementing blob detection and pattern matching techniques.

An irregular tire tread wear. This detection can be performed by using a digital camera and implementing blob detection and pattern matching techniques.

An improper wheel centering.

Using a digital camera and implementing blob detection and pattern matching techniques it is possible to identify specific problems in the tire tread such as extraneous items: stones or stickers.

Figure 3:
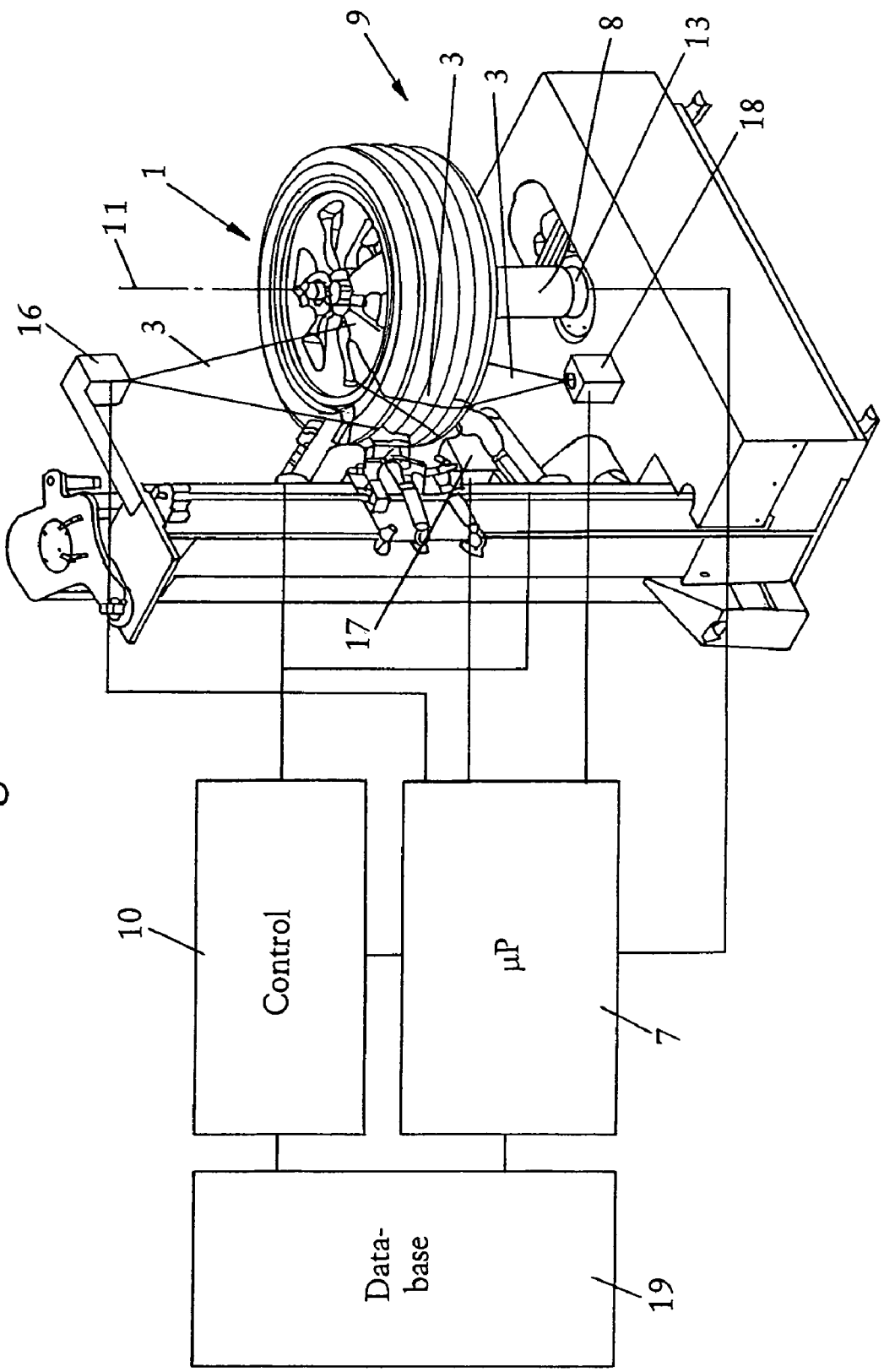
FIG. 3 shows a tyre changer which is equipped with embodiments of the sensing device.
Figure 4:
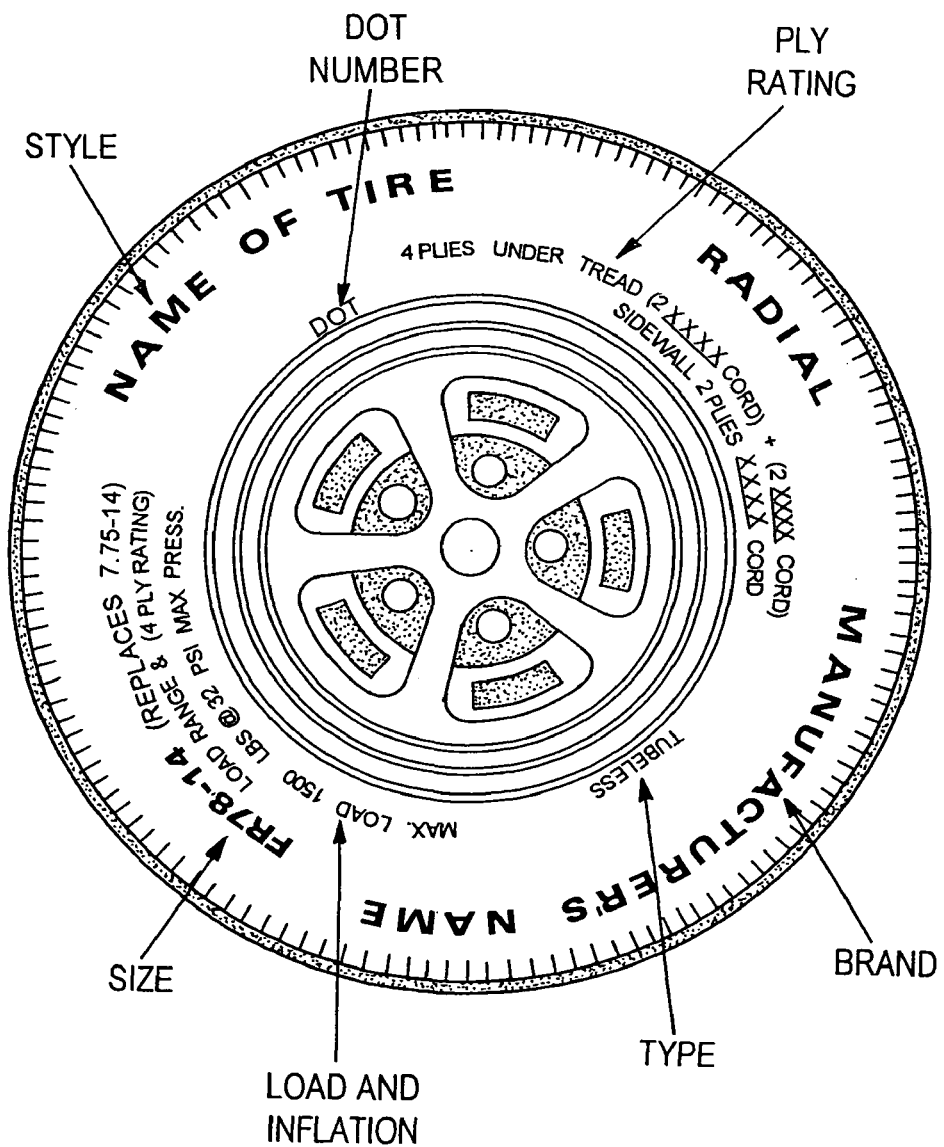
FIGS. 4 and 5 show a tyre numbering system.
Figure 5:
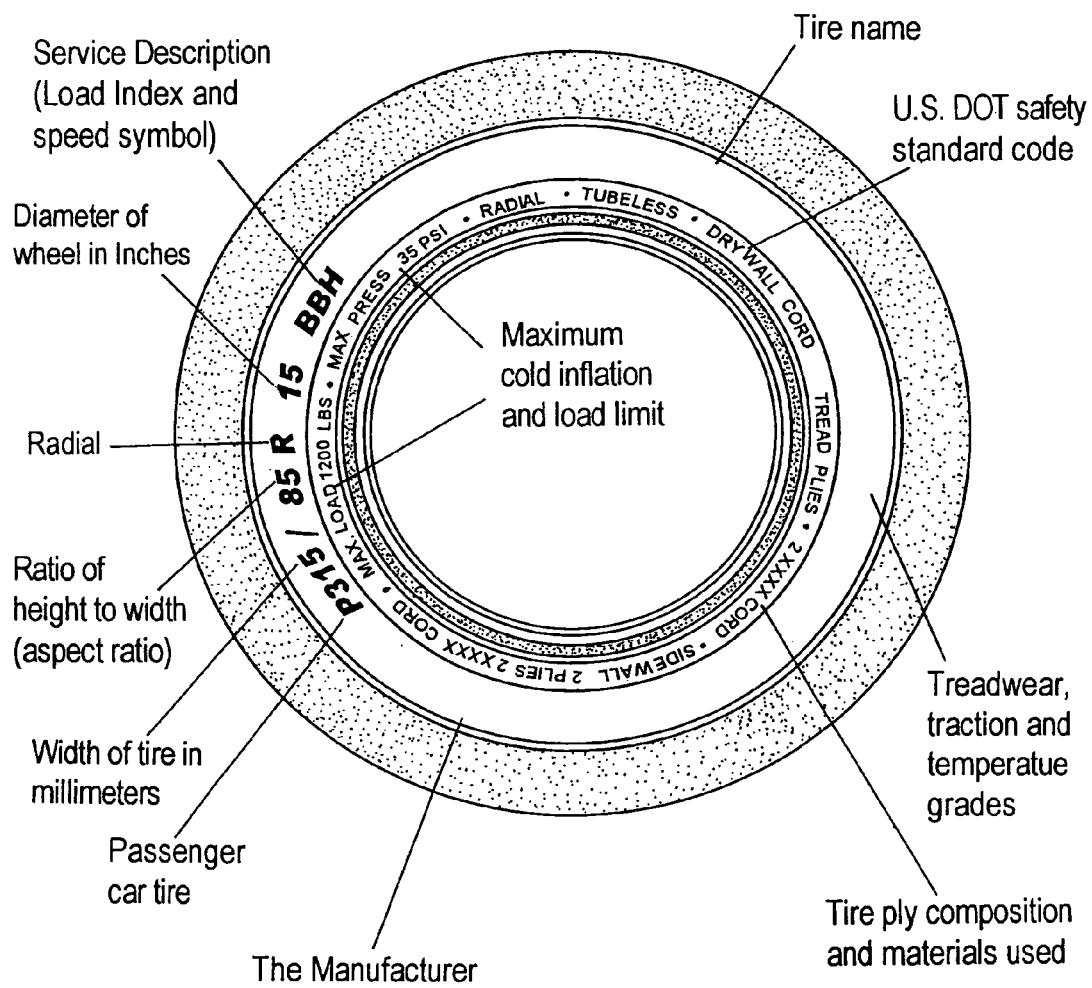

FIG. 3 shows a tyre changer 9 which is equipped with the three sensing devices 16, 17, 18 designed and working in the same fashion as shown and explained for the embodiment of FIG. 1.

The illustrated embodiment includes the wheel receiving device 8 to which a rim of a vehicle wheel (rim/tyre arrangement) 1 can be fixed.

The wheel receiving device 8 is caused to rotate by means of a rotary drive device which can be in the form of an electric motor. The rotary drive takes place about the wheel axis 11.

Provided at both sides of the rim or in the illustrated embodiment at the top side of the rim or of the wheel 1 and at the underside of the wheel 1 are the sensing devices 16 and 18 with which it is possible to implement contact-less and in particular optical sensing of the rim beads at the radial outer surface (rim bed) of the rim after the removal of the tyre. Additionally, it is possible to sense geometrical dimensions of the wheel 1 and of wheel parts, especially of the tyre.

The principle of the contact-less sensing rests on the triangulation method such as described in connection with FIG. 1.

A rotary angle sensor 13 can be provided at the drive device or at the wheel receiving device 8, for ascertaining the respective rotary angles. The corresponding rotary angle signals are sent to the evaluation arrangement 7 to which the electrical sensing signals from the sensing devices 16 and 18 are also sent. The sensing directions of the sensing devices 16 and 18 may be approximately parallel to the rotation axis 11 of the wheel 1. That evaluation arrangement 7 evaluates the sensing signals and the rotary angle signals with computer aid and, as already explained, ascertains the spatial positioning preferably of the outer peripheries and possibly also the shapes of the rim beads with respect to the reference which is fixed in relation to the machine, in particular the axis of rotation of the wheel receiving device 8, which is coincident with the wheel axis 11. In addition referencing is effected with respect to at least one horizontal plane that is fixed in relation to the machine, so that the spatial position of the rim beads with respect to the machine frame and thus with respect to the fitting or removal tools which are guided on the machine frame is determined.

In order to ensure that the bead breaking tools and the removal tools engage the tyre in the hard region of the tyre beads, control of the movements of the removal tools is effected in dependence on the position of the rim bead peripheries and the respective rim bed profile. For that purpose, a control device 10 is connected to the evaluation arrangement 7 and to a store 19, for example in the form of a database, in which, for various types of wheels, the contours of the rim beds, that is to say the contours between the respective rim beads, are stored. The positioning of the fitting or removal tools is effected along given curved paths at a spacing from the surface of the rim bed. The control device 10 includes driver stages which are suitably designed for that purpose, for the movements of the fitting and removal tools. A respective control of the tools can be performed also during the fitting of the tyre on the rim.

Advantageously, the sensing devices 16 and 18 are disposed in front of the fitting or removal tools, in a direction parallel to the wheel axis 11. The planar light beams 3 of the sensing devices 16, 18 are directed to the upper and lower siders of the vehicle wheel 1. the vertical planar in which the planar light beams 3 are extended intersect the wheel axis 11. The controlled movement of the fitting or removal tools can be effected immediately after sensing of the respective rim regions when those sensed rim regions come into the region for access of the fitting or removal tools in the rotary movement of the wheel.

A further sensing device 17 can be provided for sensing the tyre tread or after removal of the tyre the wheel rim, in particular for sensing the rim bed, and may be disposed on a support movable in a vertical direction. The sensing direction of that sensing device 17 is oriented substantially in a horizontal direction and the planar light beam 3 is extended in a vertical planar, wherein the overall width of the rim bed between the two rim beads and the outer peripheral edges of the rim beads is determined so that the contour of the rim bed is ascertained. That contour can also be detected in rotary angle-related relationship as at the same time the respective rotary angles are detected by means of the rotary angle sensor 13 and corresponding electrical rotary angle signals are fed to the control device 10. The sensing device 17, sends electrical sensing signals to the control device 10. The contour of the rim bed can be detected in rotary angle-related relationship in that way prior to the tyre fitting operation. In addition, the outer peripheral edges of the rim beads and the regions, which are adjacent to the rim bed, of the rim beads can also be sensed. As the position of the sensing device 17 is established in the same manner as the positions of the sensing devices 16 and 18 on the machine frame and are thus known, the spatial positioning of the rim bed and the rim beads can be determined in particular by the optical measurement of the spacing involved, using the previously described triangulation method. When fitting the motor vehicle tyre to the rim, the fitting tools can then be controlled in their movement in such a way that no contact occurs with the rim surface, in particular in the region of the rim beads and in the region of the rim bed.

The tyre profile can also be optically sensed with the sensing device 17 when the tyre is mounted on the rim. The side walls of the tyre and the outer (upper) side and the inner (lower) side of the rim can be sensed by the sensing devices 16 and 18.

LIST OF REFERENCES 1 vehicle wheel
2 light source
3 planar light beam
4 stripe-shaped impingement area
5 detector
6 input pupil
7 evaluation arrangement
8 wheel receiving device
9 tyre changer
10 control device
11 wheel axis
12 image sensor surface
13 rotary angle sensor
14 wheel balancer
15 measuring shaft
16 sensing devices
17 sensing devices
18 sensing devices
19 store

The invention claimed is:

1. A method of determining geometrical dimensions of a motor vehicle wheel (rim/tyre assembly) by contact-less sensing, wherein
   the wheel is fixed on wheel receiving device;
   at least one planar light beam is emitted on to the wheel or at least a part of the wheel;
   the light beam is reflected at a stripe-shaped impingement area; and
   the reflected beam is focused and projected on to a two-dimensional light sensitive image sensor surface at a stripe-shaped projected image area, wherein the image sensor surface is suitable to generate image signals which are proportional to the positions of a plurality of points of the projected image area; and
   the direction of the emitted light beam and the sensor signals are evaluated for determining the shape and/or position of the stripe-shape impingement area on the wheel.

2. A method according to claim 1, characterized in that the vehicle wheel is fixed on wheel receiving means of a wheel balancer or of a tyre changer.

3. A method according to claim 1 or 2, characterised in that at least one light beam is directed on to the wheel or to the rim which rotated about a stationary axis.

4. A method according to claim 1 or 2, characterised in that at least one light beam is emitted on to wheel or on to the rim from one or more given positions.

5. A method according to claim 1 or 2, characterised in that at least one annular surface around the wheel axis is sensed on the wheel or on the rim with the at least one light beam.

6. A method according to claim 1 or 2, characterised in that at least one of the two rim beads is sensed with the light beam.

7. A method according to claim 1 or 2, characterised in that the outer peripheral surface of the wheel or of the rim is sensed with the light beam.

8. A method according to claim 1 or 2, characterised in that the spacings of the respective wheel parts or rim parts which are sensed by the light beam relative to a stationary reference are ascertained.

9. A method according to claim 1 or 2, characterised in that the operation of determining the spacing is effected in accordance with a triangulation method.

10. A method according to claim 1 or 2, characterised in that respective emitted and reflected light beams associated to the at least plurality of impingement points of the stripe-shaped impingement area on the wheel surface are detected and the positions of the respective impingement points are determined.

11. A method according to claim 1 or 2, characterized in that the planar light beam is emitted in a plane which is parallel to the wheel axis.

12. A method of fitting or removing a motor vehicle tyre in which, using a method according to claim 1 or 2, the rim contour along which at least one fitting or removal tool is guided during the fitting or removal operation is contactlessly sensed and the movement of the fitting or removal tool is guided in dependence on the sensed contour without contact with the rim surface.

13. A method according to claim 12, characterised in that the movement of the at least one fitting or removal tool is controlled in dependence on the sensed position of at least one of the two rim beads and in dependence on the stored or sensed contour of the rim bed.

14. A method according to claim 12, characterised in that the movement on the at least one fitting or removal tool is controlled in dependence on the detected position of the outer peripheral edge of at least one of the two rim beads.

15. A method according to claim 1 or 2, characterized in that the vehicle wheel is fixed on a measuring shaft of a wheel balancer and at least one planar light beam is directed to the inner side of wheel and/or to the outer side of the wheel and or to tyre tread of the wheel.

16. An apparatus for determining geometrical dimensions of a vehicle wheel (1) comprising:
   at least one light source (2) suitable for emitting a planar light beam (3) from a given position in at least one given direction on to a stripe-shape impingement area (4) of the wheel surface or a part of the wheel surface;
   at least one detector (5) which is placed at a given position and suitable for detecting the light beam reflected from the stripe-shaped impingement area (4) on the wheel surface,
   wherein the detector (5) includes a focusing input pupil (6) through which the reflected beam is projected to a two-dimensional light sensitive sensor surface (12) arranged in the focal plane of the input pupil (6) and producing image signals which are proportional to the location of a stripe-shaped projected image area of the reflected beam on the sensor surface (12); and an evaluation arrangement (7) which is connected to the detector (5) and suitable for determining from the sensor signals the position and geometrical shape of the stripe-shape impingement area (4) on the wheel surface.

17. Apparatus according to claim 16, characterised in that the light source (2) and the detector (5) are pivotable synchronously about a common axis and an electrical signal proportional to the respective pivot angle is fed to the evaluation arrangement (7) for emit a single light beam in a planar plane.

18. Apparatus according to claim 16 or 17, characterised in that the at least one light source (2) and the detector (5) are positioned stationary.

19. Apparatus according to claim 16 or 17, characterised in that the evaluation arrangement (7) is suitable for determining positions of a plurality of points on the stripe-shaped impingement area (4) on the wheel surface from the directions of the light beam emitted by the light source (2) and the light beam reflected at the wheel surface by means of triangulation.

20. Apparatus according to claim 16 or 17, characterised in that the wheel (1) is mounted on a wheel receiving device (8) rotatably about the wheel axis (11).

21. Apparatus according to claim 16 or 17, characterised in that a rotary angle sensor (13) detects the respective rotary angle position of the wheel or the rim and supplies a corresponding electrical signal to the evaluation arrangement (7).

22. Apparatus according to claim 16 or 17, characterized in that the plane of the planar light beam (3) is approximately parallel to the rotation axis (11) of the wheel (1).

23. Apparatus according to claim 16 or 17, characterised in that the spatial positions of the respectively sensed points of the stripe-shaped impingement area (4) on the wheel surface is determined with respect to a reference position.

24. Apparatus according to claim 16 or 17, characterised in that for different wheel types geometrical features of the wheels are stored in a store (19) of the evaluation arrangement (7) or connected to the evaluation arrangement (7).

25. Apparatus according to claim 16 or 17, characterised in that the light source (2) is a laser.

26. Apparatus according to claim 16 or 17, characterised in that the sensor surface (12) comprises a complementary metal oxide semiconductor (CMOS) device.

27. Apparatus according to claim 16 or 17, characterized in that the detector (5) is a digital camera.

28. Apparatus according to claim 16 or 17, characterized in that, the light source (2) and the detector (5) are placed on a common support or in a common housing (13).

29. Apparatus according to claim 16 or 17, characterised in that the at least one light source (2) and the associated detector (5) are mounted on a wheel balancer (14).

30. Apparatus according to claim 23, characterized in that one light source (2) and the associated detector (5) are placed to scan the inner side of the vehicle wheel (1) and/or one light source (2) and the associated detector(s) are placed to scan the outer side of the vehicle wheel (1), wherein the vehicle wheel (1) is fixed to a measuring shaft (15) of the wheel balancer (14).

31. Apparatus according to claim 16 or 17, characterized in that the wheel receiving device (8) to which the wheel (1) is to be fixed, is supported on a tyre changer (9) and that a control device (10) is connected to the evaluation arrangement (7) for evaluating the sensor signals, which control device (10) controls at least one fitting or removal tool in the fitting or removal operation in dependence on the sensor signals without contact with the rim surface.

32. Use of a method according to claim 1 or of an apparatus according to claim 16 for determining at least one of the parameters: tyre runout, tread wear of the tyre, tyre conicity, tyre defects on the tread and/or on the side walls, rim defects on the outside and/on the inside of the rim and bead seat geometry on the rim, presence and/or position of at least one correcting weight, valve position.

* * * * *